United States Patent [19]

Gallagher et al.

[11] 4,288,103
[45] Sep. 8, 1981

[54] FLUID FITTING HAVING GRIPPING BASS MEANS FOR CHUCKING

[75] Inventors: Bernard J. Gallagher, Mayfield; Erling G. Wennerstrom; Mark R. Houdek, both of Cleveland, all of Ohio

[73] Assignee: Cajon Company, Solon, Ohio

[21] Appl. No.: 24,393

[22] Filed: Mar. 27, 1979

[51] Int. Cl.³ .............................................. F16L 43/00
[52] U.S. Cl. ...................................... 285/39; 29/558; 29/559; 285/179; 428/587
[58] Field of Search ............... 285/39, 179; 29/558, 29/559, 157 A

[56] References Cited

U.S. PATENT DOCUMENTS

| 35,515 | 6/1862 | Gibson et al. | 285/179 X |
|---|---|---|---|
| 1,851,031 | 3/1932 | Baldwin, Jr. | 285/179 X |
| 1,860,604 | 5/1932 | Baldwin, Jr. | |
| 1,868,037 | 7/1932 | Weatherhead, Jr. | |
| 1,926,670 | 9/1933 | Fantz | 285/179 X |
| 2,309,666 | 2/1943 | Parker | |
| 2,373,253 | 4/1945 | Martin | |
| 2,399,275 | 4/1946 | Wenk | |
| 2,568,232 | 9/1951 | Hamer | |
| 3,416,818 | 12/1968 | Conlin | |
| 3,466,066 | 9/1969 | Dawson | 285/39 |
| 3,486,771 | 12/1969 | Conlin | 285/39 |

FOREIGN PATENT DOCUMENTS

| 1805641 | 5/1970 | Fed. Rep. of Germany | 285/39 |
|---|---|---|---|
| 1003229 | 11/1951 | France | |

Primary Examiner—Thomas F. Callaghan
Attorney, Agent, or Firm—Fay & Sharpe

[57] ABSTRACT

An elbow type of fluid fitting and method for chucking for machining same wherein the fitting includes a body having a pair of fitting branches extending outwardly thereof angularly of each other. The body also includes a gripping boss extending a short distance outward thereof oppositely from one of the branches and substantially coaxial therewith. This boss facilitates chucking of a fitting blank at three separate spaced apart locations for subsequent machining and processing into the finished fitting. One of these locations is at the one branch adjacent the body and the other location is at the gripping boss to provide an increase in stability of the fitting blank during machining.

2 Claims, 6 Drawing Figures

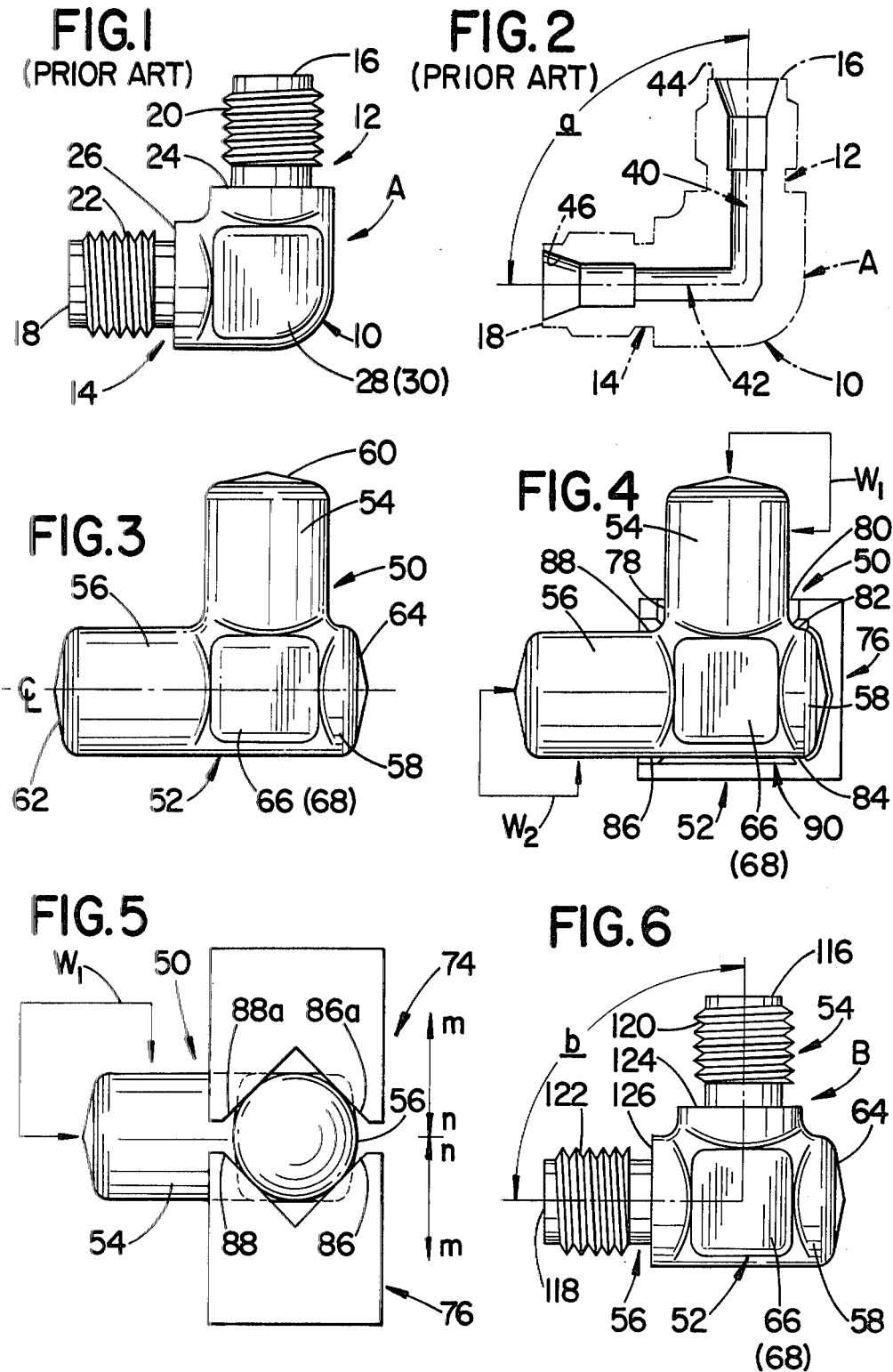

FLUID FITTING HAVING GRIPPING BASS MEANS FOR CHUCKING

BACKGROUND OF THE INVENTION

This development pertains to the art of fluid handling devices and more particularly to fluid fittings.

The development is particularly applicable to an elbow type fluid fitting and will be described with particular reference thereto. However, it will be appreciated by those skilled in the art that the invention has broader applications and may be used in other applications and environments.

Elbow type fluid fittings generally include a pair of fitting branches disposed at some angular relationship relative to each other for purposes of interconnecting adjacent ends of a pair of fluid conduit means at some desired angle. Typically, the fitting branches are disposed at substantially right angles to each other although in some instances, other angular relationships are advantageously utilized. Fluid passageways extend longitudinally of the branches and communicate with each other at their innermost ends. The outermost or terminal ends of the fitting branches include convenient means for effecting mechanical interconnections between the conduit means and elbow. Such connecting means include, but are not limited to, male and female pipe ends, tube fitting ends, weld fitting ends and the like. Certain types of elbow constructions require substantially more machining during manufacture thereof than do others. Typical of these are so-called forged fittings wherein a forged fitting blank is machined in a manner to at least include fluid passageways through the branches as well as the desired branch ends for installing the fitting in a fluid system. However, and in addition to the forged type of construction, such blanks may be die machined from stock, cast, sintered and/or molded. For some applications of elbow fittings, it is highly desired that the below branch passageways be precisely angularly disposed relative to each other. This is deemed to be particularly important when the fittings are to be used in precise installations such as gas chromatographs, nuclear reactors, medical apparatus, laboratory apparatus and the like. However, it has been noted over the years that the variation in this angularity falls within much broader ranges than the angularity experienced with respect to the axes of intersection of other types of fittings such as, for example, tees and crosses.

When machining fluid fittings of this general type, a chuck is employed for clampingly engaging the fitting to retain it in position during various machining operations. Such chucks have typically included opposed jaws constructed of hardened tool steel and configured to clamp the fitting blank in a manner which will not interfere with subsequent maching operations. When using such chucks, it is not possible to rigidly clamp an elbow type of fitting since there are only two ends or branches to begin with and one of these ends or branches will be in the process of being machined at any given time. Previously, chucks having hardened steel jaws were designed to engage each branch on opposite sides thereof adjacent the body of the fitting with the body itself being located in a receiving area of cavity in the chuck. To enhance blank stability, body engagement means penetrated the receiving area or cavity. These engagement means were selectively adjustable in the cavity to facilitate positive engagement with the body of the blank. Such chuck designs have not provided the degree of rigidity or stability required to cause the fitting to run true during machining.

To overcome the aforementioned problem, some prior clamping jaws have been molded to conform to the exterior conformation of the elbow fitting itself in an effort to provide increased support over the surfaces of the fitting. However, because of the nature of the molding operations, it is only possible to construct the jaws from a low temperature melting point, rather soft material in the nature of a pot metal. Because of its softness, this material wears easily and does not hold up well over prolonged periods of use. As a consequence, it is not possible to maintain the kind of rigidity necessary to assure optimum control over the angularity of the elbow branch passageways. Another disadvantage involved in the use of pot metal clamping jaws resides in the fact that a machine operator has to lightly "tap" the fitting blank with a hammer once it has been chucked in order to insure that it is properly seated within the chuck jaws. Such an operation is not conducive to automatic loading and necessarily results in additional man hours and machine time for producing each elbow type fitting. Moreover, and in order for the operator to "tap" the fitting, he must place his hands in close proximity with the machine which undesirably creates a potential safety hazard.

It has, therefore, been considered desirable in the industry to develop some arrangement which would overcome the aforenoted problems and others. The subject development provides an article and method which allow elbow type fluid fittings to be more accurately machined so that at least the fluid flow passageways will be more accurately positioned angularly of each other because of greater rigidity obtained in the clamping action. It also allows use of chucking systems and arrangements which more closely conform to those which are utilized for machining other types of fittings, and which facilitate automatic loading and machining for increasing production capabilities, and which are readily adapted to use for many elbow types and styles.

BRIEF DESCRIPTION OF THE INVENTION

In accordance with the present development, there is provided a new and improved elbow type of fluid fitting construction which includes a pair of elongated fitting branches angularly disposed relative to each other. Each of these branches includes a fluid passageway extending generally longitudinally therethrough into communication with the passageway in the other branch. The fitting branches are adapted to be placed in cooperative communication with the adjacent ends of a pair of fluid conduit means for placing them in fluid communication with each other. A separate gripping boss area is provided for permitting the fitting to be gripped or chucked at spaced apart locations which comprise at least a branch and the boss area during fitting manufacture to thereby provide increased chucking stability.

In accordance with another aspect of the development, the boss area is disposed oppositely from and coaxial with one of the branches to at least facilitate in-line chucking capabilities.

In accordance with another aspect of the development, the boss area has a cross-sectional configuration which is the same as at least the one branch.

According to a more limited aspect of the development, the boss area and both branches have circular cross-sections of generally the same diameter. In addition, the boss area has a length substantially less than the lengths of the two branches. In the preferred chucking arrangement, the blank is gripped at three separate locations which comprise both branches and the boss area.

In accordance with still a further aspect of the present development, an improvement is provided for a fitting blank of the type which includes only a pair of branch areas disposed angularly of each other. Each branch area, in turn, is adapted to be machined for including a fluid passageway generally longitudinally therethrough with the passageways communicating at the innermost ends thereof. The improvement comprises a separate boss area having a length less than the lengths of the branch areas. This boss area provides a clamping area for the fitting blank whereby the blank may be selectively rigidly clamped at least at a pair of spaced apart locations thereon for increasing stability during subsequent machining operations. One of these spaced apart locations comprises one of the branch areas and the another location comprises the boss area.

According to a more limited aspect of the development, the fitting blank includes a body portion which has the pair of branch areas and boss area extending outwardly therefrom. Also, the boss area extends oppositely from and coaxial with a branch area.

In accordance with still a further aspect of the present development, a method is provided for chucking a fitting blank for an elbow type fluid fitting for subsequent machining. The fitting blank includes a pair of elongated fitting branches angularly disposed relative to each other and the method facilitates more accurate generation of fluid passageways generally longitudinally of the branches. The method itself comprises the steps of:

(a) configuring the fitting blank to include a distinct boss area; and, (b) chucking the blank for machining purposes such that it is fixedly gripped at least at a pair of spaced apart locations with one location being along one of the branches and another location being along the boss area whereby greater chucking stability is achieved for subsequent machining operations performed on the blank.

According to yet a further aspect of the development, the branches themselves terminate in outermost ends and the step of chucking comprises fixedly gripping the blank at the one location inwardly along the one branch from the outermost end thereof, whereby additional machining steps may be performed adjacent the outermost end to permit installation of the finished elbow fitting into a fluid system.

The principal object of the present development is the provision of a new and improved article and method which facilitate more accurate generation of at least the fluid passageways in an elbow type of fluid fitting.

Another object of the present development is the provision of an article and method which permit easy, reliable and stable chucking of blanks or bodies during manufacture thereof into elbow type fluid fittings.

A further object of the present development is the provision of an article and method which facilitate automatic loading and machining of blanks or bodies into elbow type fluid fittings.

Still another object of the present development is the provision of an article and method for chucking which is readily adapted to use with a number of different types and styles of elbow type fitting bodies.

Additional objects and advantages to the subject article and method will become apparent to those skilled in the art upon a reading and understanding of the following specification and drawings.

BRIEF DESCRIPTION OF THE DRAWINGS

The development may take physical form in certain parts and arrangements of parts, a preferred embodiment of which will be described in detail in this specification and illustrated in the accompanying drawings which form a part hereof and wherein:

FIG. 1 is a side elevational view of a prior art elbow type fluid fitting;

FIG. 2 is a side elevational view similar to FIG. 1 showing the internal fluid passageways associated with fitting branches;

FIG. 3 is a side elevational view of a fluid fitting blank which incorporates the concepts of the subject development;

FIG. 4 is a plan view of the blank as it has been placed in a lower chuck member for machining into an elbow type fitting and with the upper chuck member removed for ease of illustration;

FIG. 5 is a left end view of the arrangement of FIG. 4; and,

FIG. 6 is a finished elbow type fitting manufactured from the blank of FIG. 3.

DESCRIPTION OF THE PREFERRED EMBODIMENT

Referring now to the drawings wherein the showings are for purposes of illustrating the preferred embodiment of the development only and not for purposes of limiting the same, FIG. 1 shows a prior art elbow fitting generally designated A and FIG. 6 shows a similar fitting generally designated B which incorporates the concepts of the subject development. While the branches of the elbows shown in these two FIGS. have so-called tube fitting ends which allow adjacent ends of fluid tubing to be fixedly secured thereto by swage-type fittings as is known in the art, it will be appreciated that other types of branch end conformations for other types of connections may also be employed. For example, male pipe threads, female pipe threads, socket weld ends and the like as well as various combinations thereof may be advantageously employed. Moreover, and while 90° or right angle elbows with the same branch sizes have been shown, it will also become apparent that the concepts of the subject development are equally applicable to elbow fittings which have the branches thereof disposed at other relative angles as well as to elbow fittings which have different sized branch passageways. Still further, elbows A and B may be constructed of any desired material to suit a particular application, including all machinable metals and plastics.

Referring particularly to FIG. 1, elbow fitting A is comprised of a body 10 having branches 12,14 extending outwardly therefrom at substantially 90° angles relative to each other. These branches terminate in outermost ends 16,18 respectively, which include threaded areas 20,22, adapted to receive associated swage type fittings (not shown) for purposes of connecting the adjacent ends of fluid lines or other associated equipment (not shown) thereto as is known in the art. Branches 12,14 include radial shoulders 24,26, respectively, adjacent the innermost ends of threaded areas 20,22. Still further, a pair of wrench flats or pads 28,30 are disposed on opposite sides of body 10 which facilitate convenient engagement by a wrench or the like during installation of the elbow into a fluid system. For metallic fittings, body 10, including branches 12,14 is typically formed of a forged blank which is subsequently machined into a final fitting configuration.

As shown in FIG. 2, branch 12 includes elongated fluid passageway 40 extending therethrough and branch 14 similarly includes an elongated fluid passageway 42 such that passageways 40,42 communicate with each other in body 10. In the arrangement shown, passageways 40,42 include tapered mouths 44,46, adjacent ends 16,18, respectively, for accommodating a particular type of tube fitting connection. Again, however, the concepts of the subject development are deemed equally applicable to elbow fittings having other types and styles of connecting means adjacent the terminal ends of the branches. Angle a in FIG. 2 represents the desired angle between the center lines of passages 40,42. In the arrangement shown, this preferred or desired angle equals 90°. For certain fitting applications and environments, it is particularly desirable to meet this angular requirement within very close tolerance limitations.

In machining a fitting blank or body into the fitting shown in FIG. 1, some difficulty has heretofore been encountered in chucking the blank for subsequently generating passageways 40,42 and threaded areas 20,22 into the associated of branches 12,14. As noted hereinabove, this difficulty has primarily stemmed from the fact that the allowable area for such chucking is extremely limited and that, in fact, only two positions on the blank, i.e., at each branch adjacent the fitting body, are available for gripping or chucking purposes. As also noted hereinabove, prior form fitting types of jaws constructed from pot metal have been unsuccessful in overcoming these prior problems. Specifically, elbow fittings such as that shown in FIG. 1 which have been manufactured by prior chucking means and methods have, upon measurement, been found to have the following angularity deviation between passageways 40,42: mean deviation—1°≠'; standard deviation—0°53'; and, typical maximum—2°52'. While such deviations may be acceptable for some applications, it has been desired to improve upon them for at least those applications where closer tolerances are dictated.

The concepts of the subject invention as shown in FIGS. 3-6 are deemed to meet the aforementioned needs. With reference to FIG. 3, a forged fitting blank generally designated 50 which allows for improved and more stable chucking is provided. This blank includes a body 52 having branches 54,56 which are substantially the same as heretofore used, but which also includes a boss or stub 58 extending outwardly thereof. While branches 54,56 are shown as being spaced 90° apart, it will be appreciated that other angular relationships could be advantageously utilized without in any way departing from the overall intent or scope of the present invention. Branches 54,56 and boss 58 terminate in outwardly extending bulbous end areas 60,62 and 64, respectively. Moreover, body 52 includes a pair of opposed wrench flats or pads 66,68.

In the blank shown, branches 54,56 and boss 58 have circular cross-sections with boss 58 extending oppositely outward from and coaxial with one of the branches. As shown in FIG. 3, this coaxial relationship is with branch 56 with at least branch 56 and boss 58 having the same outside diameter. For some alternative elbow designs, however, it may be necessary to locate the boss area slightly offset from the one branch in order to fully accommodate the fitting designs themselves. While the two branches are also shown as having the same outside diameter, it is possible that one could be of a larger diameter than the other to accommodate machining into a reducing type of elbow fitting. Nevertheless, and in the embodiment shown, it is deemed desirable to have the outside diameters of the coaxial branch and boss be equal for ease of chucking purposes. As will be further noted from FIG. 3, boss 58 extends outwardly from body 52 a lesser distance than branches 54,56 and, in the preferred embodiment, the length of this boss is approximately equal to at least 0.09" (2.286 mm). This distance provides an adequate area for chucking purposes, at least for the smaller sized fittings. For intermediate or large sizes, it may be advantageous to slightly extend the length of boss 58 to provide a greater gripping area.

FIGS. 4 and 5 show the benefits derived from the fitting blank conformation shown in FIG. 3 in terms of providing stability for the blank during machining into a finished elbow fitting. In the preferred chucking arrangement which utilizes boss 58 for clamping purposes, a pair of substantially identical clamp or chuck members comprised of an upper member 74 (FIGS. 4 and 5) and a lower member 76 (FIG. 5) are advantageously utilized. While the chuck members are shown somewhat schematically, such showing is nevertheless deemed adequate for those skilled in the art to fully appreciate the subject invention. As best shown in FIG. 4, lower chuck member 76 includes spaced apart jaws 78,80,82,84,86 and 88. A body receiving cavity 90 is also included within the perimeter defined by the jaws to closely receivingly accommodate body 52 of the blank. Jaws 78,80 are cooperatively disposed on generally opposite sides of branch 54, jaws 82,84 are cooperatively disposed on generally opposite sides of boss 58 and jaws 86,88 are cooperatively disposed on generally opposite sides of branch 56. Upper chuck member 74 has a configuration substantially identical with lower chuck member 76 and includes jaws (not shown) compatible with and opposite from the jaws or lower chuck member 76. In FIG. 5, a typical relationship between one set of jaws of both members 74,76 has been shown with the corresponding jaws of member 76 being designated by like numbers with the including of an "a" suffix. In FIG. 5, the cooperating jaw sets 86,88 and 86a,88a each define a generally V-shaped gripping area. It should be appreciated that the other of the jaw sets of both upper and lower chuck members 74,76 have similar configurations. In addition, and for purposes of rigidity, at least the jaws of both chuck members may be advantageously constructed from hardened tool steel. As best seen in FIG. 4, the cooperating jaws are spaced apart from each other so that the fitting blank may be gripped at branches 54,56 and boss 58 closely adjacent body 52. At least one of upper and lower chuck members 74 and 76 is also selectively movable by convenient means (not shown) toward and away from each other in directions n and m, respectively. In FIG. 5, both chuck members are shown as being movable. Such moving means may comprise hydraulic, pneumatic and mechanical mechanisms which are already known in the art and need not, therefore, be described in greater detail herein.

With continued reference to FIG. 5, and when the chuck members are in a closed position, the V-shaped gripping areas defined between the cooperating jaws of each chuck member closely engage the outside diameter of the associated one of branches 54,56 and boss or stub 58. This gripping or chucking action thus allows the fitting blank to be gripped at three spaced apart locations and thereby enhances stability and rigidity therefor during subsequent machining operations. Further, the type of three location gripping arrangement described above allows the necessary tooling to be compatible with tooling used in chucking blanks for tees and crosses for reducing the necessary overall tooling inventory. The oppositely disposed jaws of chuck members 74,76 are also dimensioned such that when they are moved in direction n to a closed or gripping condition, they will not engage or interfere with each other and cause any reduction of the overall gripping force. Still further, the overall structural configuration of chuck members 74,76 is such that when the members are in their closed condition, adequate clearance areas are provided at both branches 54,56 to facilitate the desired machining thereof. Such design and operational characteristics are also deemed known by those skilled in the art so that further elaboration thereon is unnecessary for purposes of appreciating the subject development.

It should be additionally noted, however, that the specifics of the clamping action described above may be varied somewhat without departing from the overall intent or scope of the present invention. For example, in some circumstances and chucking arrangements, it may be desirable to only grip the blank at only two spaced apart locations having an in-line relationship to each other. In that event, the blank may be advantageously gripped at branch 56 and boss 58. Other alternatives are also possible as may be necessary and/or desirable.

In the particular type of elbow construction here under discussion, machining on branch 54 is in the direction of the work arrows labeled $w_1$ and the direction of machining on branch 56 in the direction of work arrows $w_2$. That portion of each work arrow disposed longitudinally of the associated branch 54,56 relates to machining of the associated fluid passageway and that portion of each work arrow disposed generally transverse of each branch relates to threading the outer end area thereof for accommodating installation of the fitting into a fluid system. Since jaws constructed from hardened tool steel are contemplated for use in upper and lower chuck members 74,76, the thickness of the jaws need not be substantial in order to provide the requisite and desired stability for fitting blank 50 during machining. As a result, and as noted above, the length of boss 58 need only be at least approximately 0.09 (2.286 mm). This is significant from the standpoint of attempting to compromise between the provision of improved accuracy in the relative angular relationship between the branch passageways and a desire to minimize the amount of additional material required in forming boss 58 on the blank.

In processing the fitting blank shown in FIG. 3 in, for example, the chuck arrangement shown in FIGS. 4 and 5, the machining operations may be wholly automatic. Once chucked, a machine tool head and the chuck may be moved relative to each other in order that one of branches 54,56 may first be machined, the chucking arrangement rotated and the second branch then machined. The precise nature of the machining steps and the specific order thereof are dependent upon the type and capabilities of the machine tools utilized, the specific characteristics of the chuck and the desired physical characteristics of the end connections on the fitting branches. Since the dependency on these factors will be known to those skilled in the art, will vary do not form a specific part of the present development, they are not discussed further herein.

FIG. 6 shows the final form of an elbow B machined from fitting blank 50 of FIG. 3. More particularly, the fitting includes a fitting body generally designated 52 and a pair of fitting branches generally designated 54,56. These branches terminate in outermost ends 116,118, respectively, having threaded areas 120,122 adapted to swage-type tube fittings. Radial shoulders 124,126 are disposed between the innermost ends of threaded areas 120,122 and the remaining portion of original branches 54,56. Opposed wrench flats or pads 66,68 provide tool gripping areas for holding the fitting during actual installation. Boss or stub 58 and outwardly bulbous end areas 64 associated therewith remain an integral part of the fitting and do not perform any significant function or use except for chucking of the fitting blank during the machining operations. As will be noted by comparing the prior art fitting of FIG. 1 and the fitting of FIG. 6, the only substantial difference therebetween is the inclusion of boss 58 into the new fitting blank and fitting and the use thereof for chucking purposes.

Fluid passageways (not shown) extend longitudinally of the branches of the FIG. 6 embodiment and are angularly spaced apart at an angle b. In this embodiment, it is desired that this angle be substantially equal to 90° similar to angle a shown in the prior art construction of FIG. 2 although, again, other relative angular relationships may be achieved for other types of elbow designs. By using the fitting blank of FIG. 3 and the chucking described with reference to FIGS. 4 and 5, the deviation of angle b may be substantially reduced from the deviation associated with prior art fittings such as angle a shown in FIG. 2.

For example, and based upon actual results produced by the present concept, a summary of the angularity deviation for the arrangement shown in FIGS. 3–6 is as follows: mean deviation—0°9'; standard deviation—0°7'; and, typical maximum deviation—0°≦'. In comparing these results with the results previously set forth for prior art elbows, the angularity deviation has been reduced by a factor of between 7 and 8. This reduction factor is considered significant and allows the angularity of the branch passageways to be more closely controlled to meet more exacting tolerance requirements for some fitting applications.

Again, and while the subject development has been shown and described with reference to an elbow construction adapted to be placed in a fluid system by meansof compression type fittings, it will be readily appreciated that the overall concepts are equally applicable to elbows having other types of branch connecting capabilities. By way of example, one size of elbow fitting blank may be used to manufacture an elbow with 1/16" female pipe thread (FPT) ends, ⅛" male pipe thread (MPT) ends or ¼" compression fitting ends; another size of blank may be used to manufacture an elbow with ½" FPT, ¼" MPT and ⅜" compression fitting ends; and still another size of blank may be used to manufacture and ½" FPT, ⅜" MPT and ½" compression fitting ends. The aforementioned are examples only and do not in any way limit the overall number of fitting sizes to which the subject development is deemed applicable. However, for larger fitting sizes, it may be desirable to slightly increase the lengths of the boss or stub areas to facilitate secure chucking. Although 90° elbow designs are shown, the concepts are also applicable to elbows having greater or lesser angularity between the branches.

The development has been described with reference to the preferred embodiment. Obviously, modifications and alterations will occur to others upon the reading and understanding of this specification. It is our intention to include all such modifications and alterations insofar as they come within the scope of the appended claims or the equivalents thereof.

Having thus described our invention, we now claim:

1. A fluid fitting comprising:
a pair of elongated fitting branches angularly disposed relative to each other; a fluid passageway extending longitudinally through each of said branches into communication with each other, said branches adapted to be placed in cooperative communication with the ends of a pair of adjacent fluid conduit means for placing said conduit means in fluid communication with each other; and, a separate gripping boss area having a length of approximately 2.286 mm with said boss area and one of said branches spaced therefrom having circular cross sections and defining gripping means, said gripping means permitting said fitting to be gripped at spaced apart locations by chucking means during fitting manufacture for providing fitting stability and allowing at least said passageways to be more accurately generated at a desired angular relationship relative to each other.

2. A forged elbow fitting comprising:
a fitting body; a pair of fitting branches integral with said body disposed to extend outwardly therefrom at substantially right angles to each other and having fluid passageways extending longitudinally therethrough into communication with each other in said fitting body, said fitting branches further including means adjacent the outermost ends thereof adapted to permit the adjacent end areas of a pair of fluid conduit means to be fixedly secured thereto and with a portion of said branches each having a generally circular cross-section at least adjacent said fitting body; and, a gripping boss integral with and extending outwardly of said fitting body oppositely from and coaxial with one of said branches with said boss having a length of at least approximately 2.286 mm, said boss having a generally circular cross-section with an outside diameter generally equal to the outside diameter of said portion of said each branch, said boss and said at least a portion of one of said branches defining gripping means for allowing said fitting to be clampingly retained at spaced apart locations at fitting manufacture for increasing the stability of said fitting during chucking for machining purposes.

* * * * *

Disclaimer 4,288,103.—*Bernard J. Gallagher,* Mayfield; *Erling G. Wennerstrom* and *Mark R. Houdek,* Cleveland *Mark R. Houdek,* Cleveland and Laszlo Aliczky, Solon, Ohio. FLUID FITTING HAVING GRIPPING BASS MEANS FOR CHUCKING. Patent dated Sept. 8, 1981. Disclaimer filed May 7, 1981, by the assignee, *Cajon Co.*

The term of this patent subsequent to Jan. 20, 1995, has been disclaimed.
[*Official Gazette Jan. 5, 1982*]